No. 873,718. PATENTED DEC. 17, 1907.
O. E. CASEY.
DITCHING AND GRADING MACHINE.
APPLICATION FILED SEPT. 3, 1907.
2 SHEETS—SHEET 2.
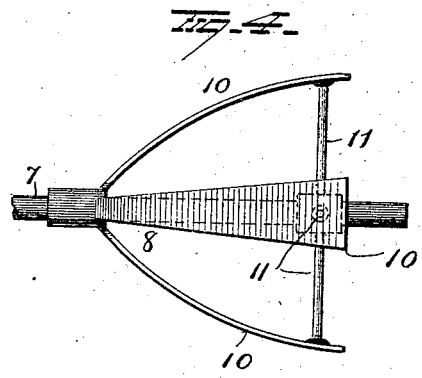
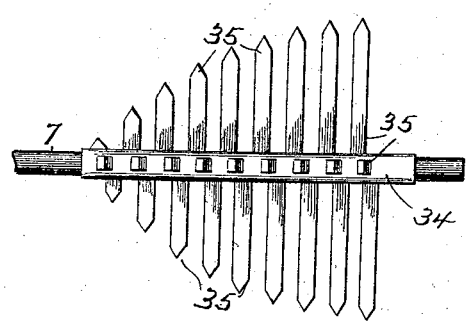

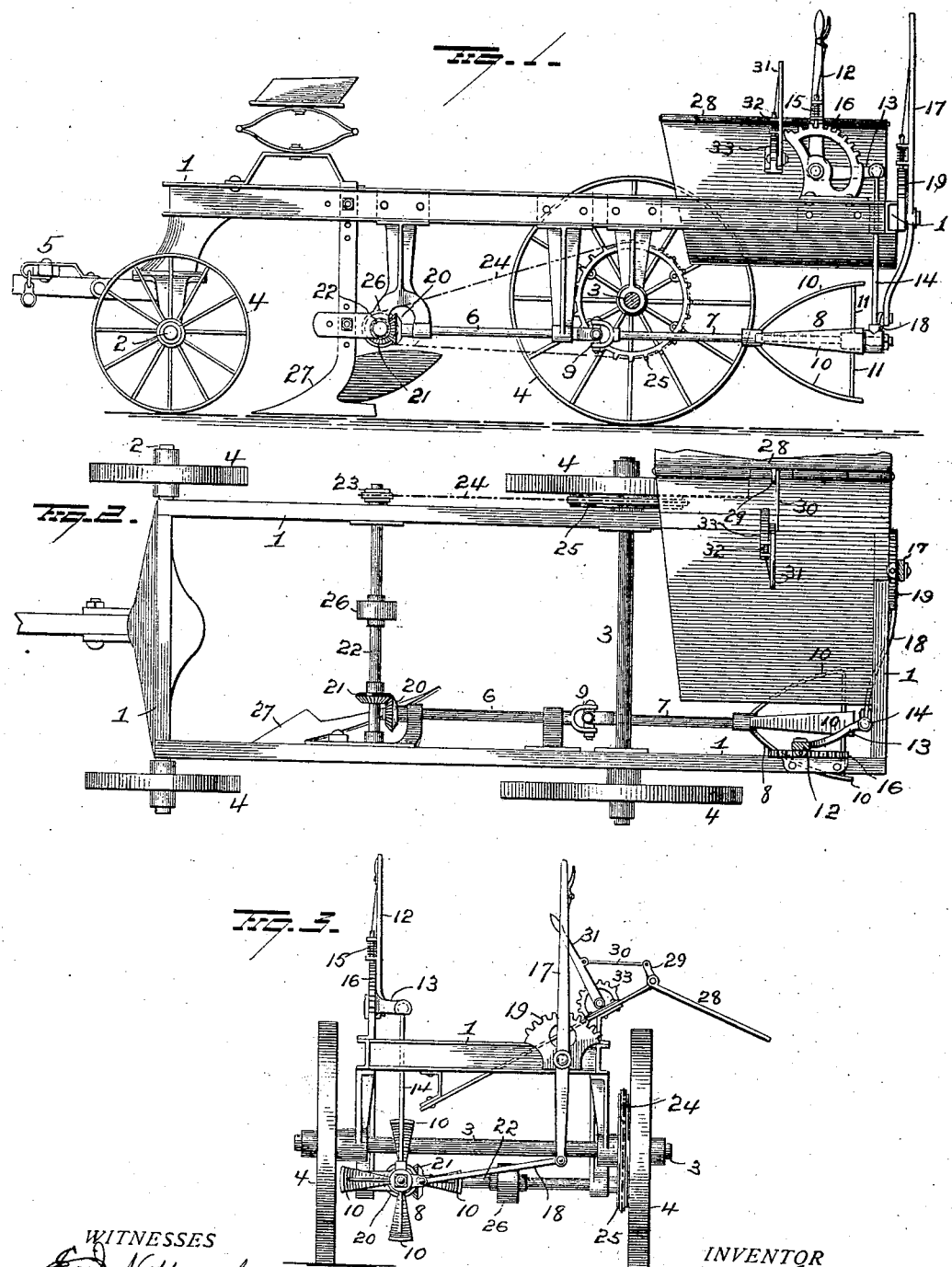

UNITED STATES PATENT OFFICE.

OWEN E. CASEY, OF NASHUA, MINNESOTA.

DITCHING AND GRADING MACHINE.

No. 873,718.  Specification of Letters Patent.  Patented Dec. 17, 1907.

Application filed September 3, 1907. Serial No. 391,158.

*To all whom it may concern:*

Be it known that I, OWEN E. CASEY, of Nashua, in the county of Wilkin and State of Minnesota, have invented certain new and useful Improvements in Ditching and Grading Machines; and I do hereby declare the following to be a full, clear, and exact description of the invention, such as will enable others skilled in the art to which it appertains to make and use the same.

My invention relates to improvements in machines for grading roads and for ditching,—the object of the invention being to so construct a machine of the character specified that, as the machine travels forward, the dirt will be taken from the roadway and thrown laterally so as to be deposited in the center of the roadway, or, when constructing a ditch, so that the dirt will be thrown laterally from the machine and scattered over the ground some distance from the ditch under construction.

With this object in view the invention consists in certain novel features of construction and combinations and arrangement of parts as hereinafter set forth and pointed out in the claims.

In the accompanying drawings, Figure 1 is a longitudinal sectional view of a machine embodying my improvements. Fig. 2 is a plan view. Fig. 3 is a rear end view, and Figs. 4 and 5 are enlarged detail views illustrating different constructions of the dirt-throwing device.

1 represents a rectangular frame provided with axles 2, 3 mounted at their ends in hubs on suitable carrying-wheels 4. The forward end of the frame has attached thereto, draft devices 5 of any desired form of construction. A shaft 6 is mounted in suitable bearings on the frame 1 so as to be disposed parallel with the longitudinal axis of the latter, and with the rear end of this shaft the forward end of the shaft 7 of a dirt-thrower 8, is connected through the medium of a universal coupling 9. The dirt-thrower 8 (in the form of the invention shown in Fig. 4) has a general conical form and comprises a series of blades 10 secured at their forward ends to the shaft 7 and the rear ends of said blades (which are wider than their forward ends) are connected by brace-rods 11 and the latter are also secured to the shaft 7. A lever 12 is mounted upon the frame and the short arm 13 of this lever is connected, through the medium of a rod 14, with the rear end of the dirt-thrower-shaft 7. The lever 12 is provided with a latch 15 to engage a toothed-segment 16 whereby the dirt-thrower can be secured at any desired elevation. By manipulating the lever 12 the dirt-thrower can be lowered onto the ground with any desired pressure. Another lever 17 is mounted on the frame-work and connected with the dirt-thrower by means of a rod 18. This lever is also provided with a latch to engage a toothed-segment 19 for securing the dirt-thrower at any desired lateral adjustment to which it may be moved by the lever 17.

The forward end of the shaft 6 is provided with a beveled gear 20 which receives motion from a similar gear 21 on a shaft 22 mounted transversely on the frame-work. The shaft 22 is also provided with a sprocket-wheel 23 to receive a sprocket chain 24, by means of which motion is transmitted from a larger sprocket-wheel 25 on one of the carrying-wheels. If desired however the shaft 22 may be driven by means of a gasolene or other motor and for this reason the shaft 22 will be provided with a pulley 26 to receive a strap from such motor.

For the purpose of loosening the earth to be removed by the blades of the dirt-thrower, a plow 27 of any desired construction may be secured to the forward portion of the frame-work.

As the machine moves forward, the dirt-thrower will be caused to rotate rapidly and, engaging or striking the loosened soil, will cause the latter to be thrown laterally and when the machine is being used in constructing a ditch, the dirt thus thrown will be scattered broadcast so as to avoid the formation of an embankment alongside the ditch. When the machine is used in grading a road however, it is desirable that the dirt shall be so thrown as to be concentrated in the center of the roadway. For this reason I provide a guard 28 pivotally connected or hinged to a suitable support on the frame-work and provided with an arm 29 which is connected, by means of a rod 30 with a lever 31 and the latter is provided with a latch 32 to engage a toothed-segment 33. By means of this guard the dirt will be prevented from being thrown broadcast and will be caught and caused to fall upon the roadway a comparatively short distance laterally from the machine. The distance which the dirt will be thrown can be regulated by adjusting the angle of the guard.

The dirt-thrower will not only operate to remove the dirt by striking it, but it will also create a draft of air which will assist in carrying the lighter dirt particles or dust laterally. If desired the plow hereinbefore referred to may be dispensed with and the form of dirt-thrower shown in Fig. 5 employed instead of the dirt-thrower having blades. The construction shown in Fig. 5 comprises a shaft 34 similar in all respects to the shaft 7 and will be attached to the universal coupling in the same manner in which said shaft 7 is shown attached in Fig. 2. This dirt-thrower also has a general conical form but instead of employing flat-blades as shown in Fig. 4, several series of fingers 35 are secured to the shaft 34 and the outer end of each finger is pointed so that when the device is rapidly rotated it will loosen the soil and also throw the same laterally.

Various slight changes might be made in the details of construction of my invention without departing from the spirit thereof or limiting its scope and hence I do not wish to be restricted to the precise details herein set forth.

Having fully described my invention what I claim as new and desire to secure by Letters-Patent,—

1. In a machine of the character described, the combination with a traveling frame, of a dirt-thrower mounted thereon and having an approximately horizontal axis, and means for rapidly rotating said dirt-thrower axially to cause it to throw dirt in a direction laterally from the machine.

2. In a machine of the character described, the combination with a traveling frame, of a dirt-thrower, means for rapidly rotating said dirt-thrower, and an adjustable guard to direct the dirt thrown laterally by the dirt-thrower.

3. In a machine of the character described, the combination with a traveling frame, of a dirt-thrower mounted thereon and adapted to discharge dirt laterally from the machine, means for adjusting the dirt-thrower vertically, and means for rapidly rotating said dirt-thrower.

4. In a machine of the character described, the combination with a traveling frame, of a dirt-thrower mounted thereon and adapted to discharge dirt laterally from the machine, means for moving the dirt-thrower downwardly in contact with the ground, means for adjusting said dirt-thrower laterally, and driving means for the dirt thrower.

5. In a machine of the character described, the combination with a traveling frame, of a dirt-thrower having a general conical form and comprising a series of devices to engage the soil and throw the same laterally from the machine, and means for rapidly rotating said dirt-thrower.

6. In a machine of the character described, the combination with a traveling frame, a shaft mounted thereon and means for rotating said shaft, of a dirt-thrower connected with and trailing behind said shaft.

7. In a machine of the character described, the combination with a traveling frame, a shaft mounted thereon and means for rotating said shaft, of a dirt-thrower having a general conical form and provided with a shaft connected with and rotated by said first mentioned shaft.

8. In a machine of the character described, the combination with a traveling frame, a shaft mounted thereon and means for rotating said shaft, of a dirt-thrower provided with a shaft, a universal coupling connecting said shaft, and levers connected with the rear end of the dirt-thrower shaft for adjusting the dirt-thrower vertically and laterally.

9. In a machine of the character described, the combination with a traveling frame, a dirt-thrower adapted to throw dirt laterally from the machine and means for rotating said dirt-thrower, of a guard having a hinged connection with the frame of the machine, an arm projecting from said guard, a lever, a connection between said arm and lever, and means for locking the lever to secure the guard at any desired angle.

In testimony whereof, I have signed this specification in the presence of two subscribing witnesses.

OWEN E. CASEY.

Witnesses:
C. A. PRESTRUD,
T. A. BOYD.